July 8, 1924.
E. HARTUNG
VEHICLE WHEEL RIM JACK
Filed July 16, 1923
1,500,813
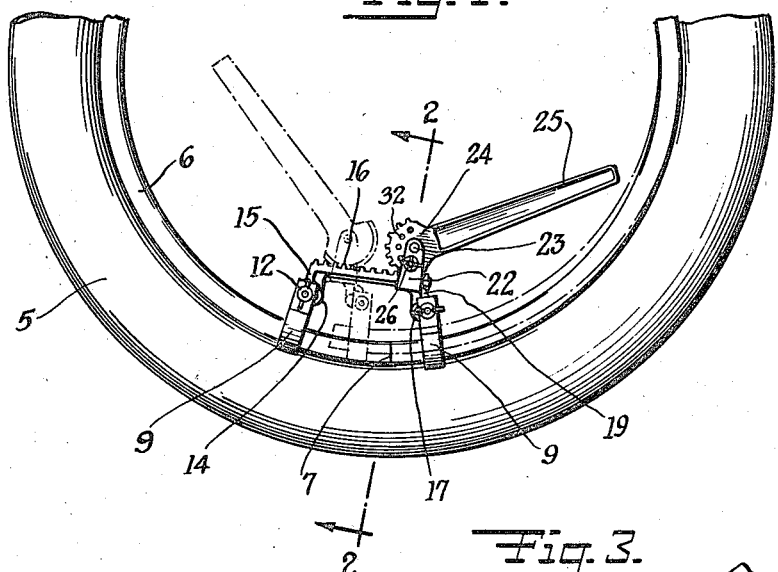
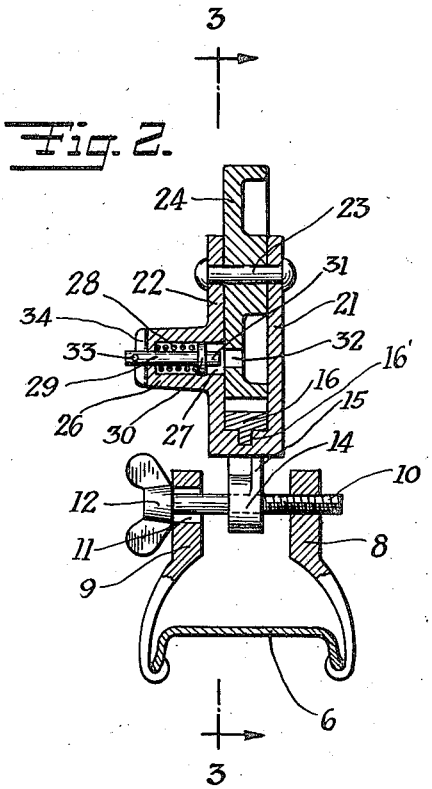
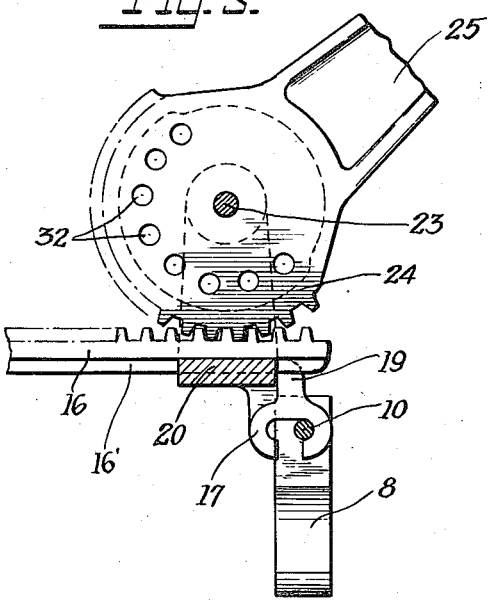
INVENTOR
Edmund Hartung
BY
ATTORNEY Patented July 8, 1924.

1,500,813

UNITED STATES PATENT OFFICE.

EDMUND HARTUNG, OF JERSEY CITY, NEW JERSEY.

VEHICLE WHEEL-RIM JACK.

Application filed July 16, 1923. Serial No. 651,715.

*To all whom it may concern:*

Be it known that I, EDMUND HARTUNG, a citizen of Poland, residing at Jersey City, in the county of Hudson and State of New Jersey, have invented certain new and useful Improvements in Vehicle Wheel-Rim Jacks, of which the following is a specification.

This invention relates to improvements in appliances for releasing and resetting vehicle wheel rims as used in connection with inflated tires and has as one of its objects to provide a simple tool for engaging the ends of a rim so that they may be moved out of register and engaged or disengaged with respect to the tire in an easy and effective manner.

Another purpose is to produce a pair of gripping devices combined with means for moving them towards or from each other in a positive and powerful manner, with a moderate exertion of physical force.

A further aim is in the provision of a device that can be readily carried on the vehicle, the appliance being light in weight and small in compass.

These several objects are attained by the novel construction and combination of parts hereafter described and shown in the accompanying drawing, forming a material part hereof, and in which:—

Figure 1 is a side elevational view of a portion of a conventional type of tire and rim, showing an application of an embodiment of the invention.

Figure 2 is an enlarged transverse sectional view taken on line 2—2 of Figure 1.

Figure 3 is a fragmentary partial side, partial sectional view of the same, the section being taken on line 3—3 of Figure 2.

In the drawing, the numeral 5 designates the tire of a wheel and 6 the rim supporting the same, this rim having its ends normally abutting as at 7 but capable of being forced into the position shown by the broken lines in Figure 1 when removing or replacing the tire.

The invention is composed of two like pairs of gripping elements, respectively 8 and 9 constituting rim clamps capable of engaging a standard form of rim as shown in Figure 2.

The elements 8 are tapped to receive screws 10, the shank of which passes freely through elongated slots 11 in the mating element 9, the winged heads 12 of the screws impinging upon the outer sides of the elements so that upon turning the screws the clamp members will be adjusted to or from each other.

The lower portions of these elements are curved outwardly and formed with hook shaped terminals as best seen in Figure 2, to engage the rim without materially disturbing the tire.

Engaging the screws or bolts 10 of one pair of the clamps is an open loop 14 having a raised stem 15 from which extends, at approximately a right angle, a rack bar 16 having teeth on its upper surface and a rib 16 on its lower side and a reenforcing guide rib below.

A similar open loop 17 engages the bolt of the other clamp, and has formed on it a stem 19 extending towards the mating clamp, and presenting a seat 20 from which rise a pair of spaced standards 21 and 22, between which the rack 16 is free to slide on the seat 20.

A spindle 23 passes through the standards and is riveted or upset on their outer surfaces, this spindle having rotatably mounted upon it a toothed segment 24, its teeth meshing with those of the rack 16 so as to convey rectilinear motion to it upon actuating the lever 25 formed with the segment.

Extending laterally out from the standard 22 is a boss 26 containing an opening 27 containing a coiled compression spring 28 encircling a plunger stem 29 having a fixed collar 30 from which projects a detent 31 adapted to engage in any of the openings 32 in the segment 24 when brought into registration.

The extending end of the plunger stem 29 carries a fixed transverse pin 33 which may rest in a notch formed in the end of the boss 26, at which time the spring will be compressed and the detent withdrawn, or by giving the stem a quarter turn the pin 33 may enter a transverse slot 34 in the boss, permitting the detent to be engaged in one of the openings 32, thus locking the segment in its adjusted position and holding the clamped ends of the tire as may be desired.

In operation, the two clamps are fastened one upon each side of the rim ends by tightening the wing nuts to the proper extent; upon moving the lever handle 25 to the left, the ends of the rim will be drawn in or past each other, permitting a tire to be removed or replaced thereafter moving the handles to the right, as shown in the full lines in Figure 1 which operation expands the rim and engages the tire securely.

It is to be noted that essentially only four parts are employed, all being of simple construction and readily operated with little labor and in a short period of time.

Having thus described my invention, what I claim as new and desire to secure by Letters Patent, is:—

A rim jack comprising a pair of rim clamps, hand bolts for drawing the members of each pair towards each other, a forked bracket engageable with one of said bolts, a rack engageable with the other bolt, said rack being operable in the bracket, a segment having teeth meshing with said rack, said segment being pivoted in the fork of said bracket, a handle lever integral with said segment, said segment having a concentric row of spaced openings, a spring actuated detent carried on said bracket engageable in any of the segment openings when brought into register, and means for restraining the action of said detent.

In witness whereof I have affixed my signature.

EDMUND HARTUNG.